(12) United States Patent
Adam et al.

(10) Patent No.: US 9,487,212 B1
(45) Date of Patent: Nov. 8, 2016

(54) METHOD AND SYSTEM FOR CONTROLLING VEHICLE WITH AUTOMATED DRIVING SYSTEM

(71) Applicant: GM GLOBAL TECHNOLOGY OPERATIONS LLC, Detroit, MI (US)

(72) Inventors: Paul A. Adam, Milford, MI (US); Kevin A. O'Dea, Ann Arbor, MI (US); Dmitriy Feldman, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/879,385

(22) Filed: Oct. 9, 2015

(51) Int. Cl.
　　*G08G 1/16* (2006.01)
　　*B60W 30/14* (2006.01)
　　*B60W 30/16* (2012.01)
　　*B60W 30/18* (2012.01)

(52) U.S. Cl.
　　CPC ............ *B60W 30/143* (2013.01); *B60W 30/16* (2013.01); *B60W 30/18163* (2013.01); *B60W 2520/10* (2013.01); *B60W 2520/28* (2013.01); *B60W 2540/04* (2013.01); *B60W 2550/12* (2013.01); *B60W 2750/30* (2013.01)

(58) Field of Classification Search
　　CPC ........ G08G 1/16; B60W 30/143; G05D 1/02
　　See application file for complete search history.

(56) References Cited

U.S. PATENT DOCUMENTS

| 7,765,066 | B2 * | 7/2010 | Braeuchle | B60W 30/095 382/103 |
| 9,393,998 | B2 * | 7/2016 | Clarke | B62D 15/0265 |
| 2003/0025597 | A1 * | 2/2003 | Schofield | B60Q 1/346 340/435 |
| 2010/0023218 | A1 * | 1/2010 | Hayakawa | B60W 10/06 701/42 |
| 2012/0265431 | A1 * | 10/2012 | Hayakawa | B60T 7/22 701/301 |
| 2013/0151058 | A1 * | 6/2013 | Zagorski | B60W 30/09 701/23 |
| 2015/0151725 | A1 * | 6/2015 | Clarke | B60W 30/00 701/28 |

\* cited by examiner

*Primary Examiner* — Thomas Tarcza
*Assistant Examiner* — Alex C Dunn
(74) *Attorney, Agent, or Firm* — Reising Ethington, P.C.; Lionel D. Anderson

(57) ABSTRACT

A method and system for controlling a position of a vehicle relative to other vehicles on a road is provided. The method includes controlling a position of a host vehicle travelling in a lane of a road using an automated driving system and monitoring positions of one or more side vehicles located on either side of the host vehicle and traveling in adjacent lanes. The method further includes detecting a condition in which the host vehicle is or will be positioned in a blind spot of a side vehicle disposed on in an adjacent lane and adjusting the position of the host vehicle in response to the condition using the automated driving system such that the amount of time the host vehicle is or will be positioned in the blind spot of the side vehicle is reduced.

22 Claims, 4 Drawing Sheets

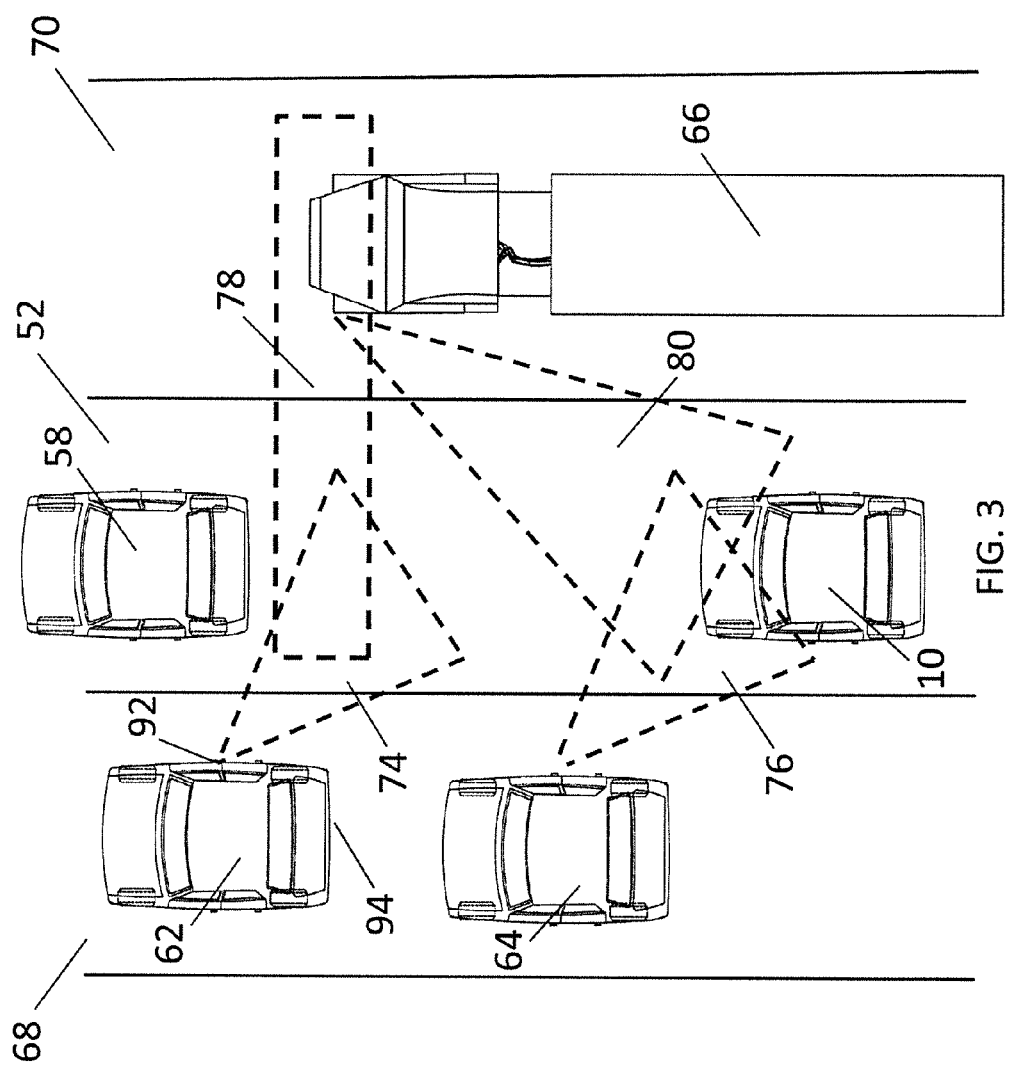

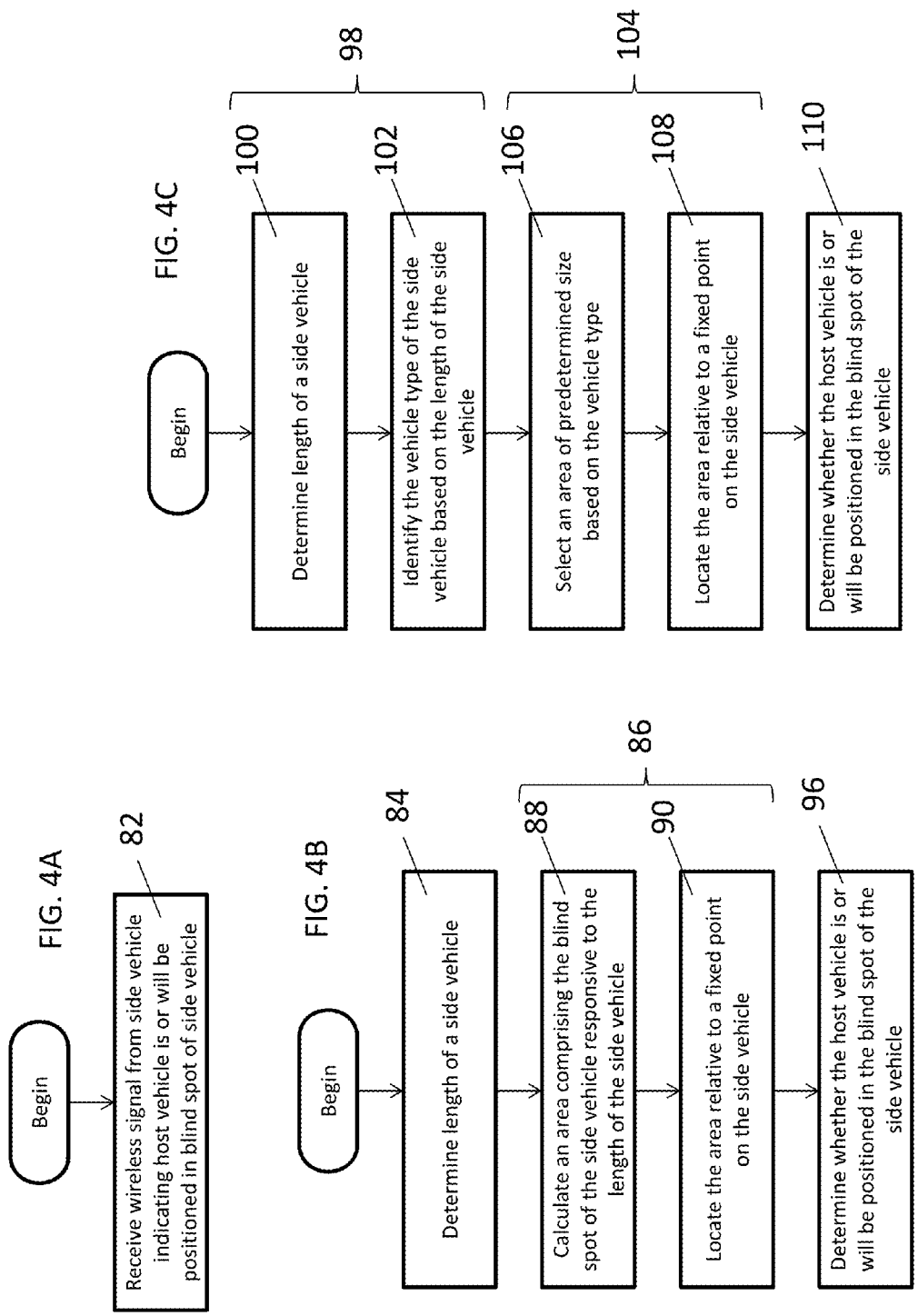

METHOD AND SYSTEM FOR CONTROLLING VEHICLE WITH AUTOMATED DRIVING SYSTEM

FIELD

The present invention relates generally to a vehicle system. More specifically, the invention relates to a method and system for controlling the position of a vehicle relative to other vehicles on a road in order to reduce the amount of time that the vehicle is within blind spots of the other vehicles.

BACKGROUND

Modern vehicles increasingly include automated driving systems such as adaptive cruise control systems that control movement of the vehicle on the road. In some circumstances, automated control of the vehicle may cause the vehicle to be positioned within a blind spot of a vehicle in an adjacent lane. An adaptive cruise control system, for example may be configured to maintain a specific speed for a host vehicle and a specific spacing from a vehicle disposed in front of the host vehicle. Maintaining this speed and/or spacing for extended periods may cause the host vehicle to be located in a blind spot of a vehicle in an adjacent lane and to remain in that blind spot for an extended period.

SUMMARY

According to one embodiment, there is provided a method for controlling a position of a vehicle relative to other vehicles on a road. The method includes controlling a position of a host vehicle travelling in a lane of a road using an automated driving system. The method further includes monitoring positions of one or more side vehicles located on either side of the host vehicle and traveling in lanes of the road adjacent to the lane of the road in which the host vehicle is travelling. The method further includes detecting a condition in which the host vehicle is or will be positioned in a blind spot of a side vehicle disposed on a side of the host vehicle and in an adjacent lane to the lane of the road in which the host vehicle is travelling. The method further includes adjusting the position of the host vehicle in response to the condition using the automated driving system such that the amount of time the host vehicle is or will be positioned in the blind spot of the side vehicle is reduced.

According to another embodiment, there is provided a method for controlling a position of a vehicle relative to other vehicles on a road. The method includes controlling a position of a host vehicle travelling in a lane of a road using an automated driving system. The method further includes monitoring positions of one or more side vehicles located on either side of the host vehicle and traveling in lanes of the road adjacent to the lane of the road in which the host vehicle is travelling. The method further includes detecting a first condition in which the host vehicle is or will be positioned in a first blind spot of a first side vehicle disposed on a first side of the host vehicle and in a first adjacent lane to the lane of the road in which the host vehicle is travelling and detecting a second condition in which the host vehicle is or will be positioned in a second blind spot of one of the first side vehicle and a second side vehicle, the second side vehicle disposed on one of the first side of the host vehicle in the first adjacent lane and a second side of the host vehicle in a second adjacent lane to the lane of the road in which the host vehicle is travelling. The method further includes adjusting the position of the host vehicle in response to the first and second conditions using the automated driving system such that the amount of time the host vehicle is or will be positioned in at least one of the first and second blind spots is reduced.

According to another embodiment, there is provided a system for controlling a position of a vehicle relative to other vehicles on a road. The system includes an automated driving system configured to control a position of the host vehicle travelling in a lane of a road. The system further includes at least one sensor configured to generate a signal indicative of the positions of one or more side vehicles located on either side of the host vehicle and traveling in lanes of the road adjacent to the lane of the road in which the host vehicle is travelling. The system further includes a controller. The controller is configured to detect a condition in which the host vehicle is or will be positioned in a blind spot of a side vehicle disposed on a side of the host vehicle and in an adjacent lane to the lane of the road in which the host vehicle is travelling. The controller is further configured to adjust the position of the host vehicle in response to the condition using the automated driving system such that the amount of time the host vehicle is or will be positioned in the blind spot of the side vehicle is reduced.

DRAWINGS

Preferred exemplary embodiments will hereinafter be described in conjunction with the appended drawings, wherein like designations denote like elements, and wherein:

FIG. 3 is a schematic view illustrating travel of a vehicle along a road through potential blind spots of other vehicles on the road; and, FIGS. 4A-C are flowcharts illustrating various embodiments of one of the method steps shown in FIG. 2.

DESCRIPTION

The system and method described herein may be used to control the position of a vehicle relative to other vehicles on a road in order to reduce the amount of time that the vehicle is within blind spots of the other vehicles. According to an exemplary embodiment, an automated driving system is used to control the position of a host vehicle travelling in a lane of a road. Sensors mounted on the host vehicle monitor the positions of side vehicles located on either side of the host vehicle and travelling in lanes of the road adjacent to the lane of the host vehicle. A controller detects conditions in which the host vehicle is or will be positioned in blind spots of the side vehicles and adjusts the position of the host vehicle in response to the detected condition using the automated driving system to reduce the amount of time that the host vehicle is or will be positioned in the blind spots of the side vehicles.

Figure 1:
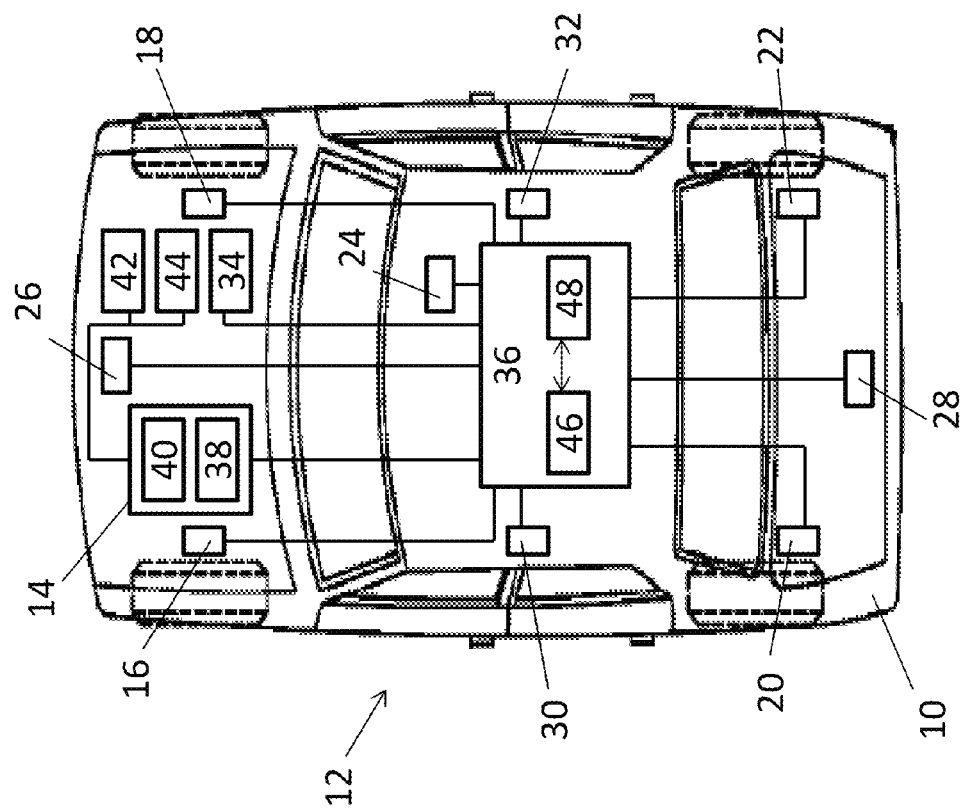
FIG. 1 is a schematic view of a vehicle including one embodiment of a system for controlling a position of the vehicle relative to other vehicles on a road.

Referring now to the drawings wherein like reference numerals are used to identify identical components in the various views, FIG. 1 illustrates a vehicle 10 including one embodiment of a system 12 for controlling a position of vehicle 10 relative to other vehicles on a road. Although vehicle 10 is illustrated as a passenger automobile, it should be understood that the disclosed system and method could be used with any type of vehicle including, for example, motorcycles, passenger vehicles, sport utility vehicles (SUVs), cross-over vehicles, vans, trucks, buses, recreational vehicles (RVs), etc. System 12 may include an automated driving system 14, a variety of sensors 16, 18, 20, 22, 24, 26, 28, 30, 32, a communications module 34, and a controller 36.

Automated driving system 14 controls one or more movements of vehicle 10 in response to various conditions including operating conditions of vehicle 10, environmental conditions, and/or road and traffic conditions. As used herein an "automated driving system" is a system that controls movement of vehicle 10 with no or limited input from a driver. Automated driving systems can therefore range from fully autonomous driving systems (i.e., self-driving vehicles) to advanced driver assistance systems that perform specific vehicle functions such as cruise control systems, collision avoidance systems, automated lane change systems, emergency driver assistance systems and crosswind stabilization systems. An automated driving system may be considered any of the systems falling within levels 1-5 of SAE International standard J3016: Taxonomy and Definitions for Terms Related to On-Road Motor Vehicle Automated Driving Systems.

In one embodiment, automated driving system 14 comprises a full speed range adaptive cruise control (FSRACC) system. A FSRACC system controls both the speed of vehicle 10 and the spacing between vehicle 10 and a vehicle disposed forward of vehicle 10. A FSRACC system is also capable of bringing vehicle 10 to a complete stop if required (i.e., the system does not cease operation below a predetermined speed unlike partial cruise control systems). System 14 may include a user interface 38 and a controller 40.

Interface 38 enables the exchange of information or data with the driver or other occupants of vehicle 10. The interface 38 may include any combination of visual, audio, haptic and/or other types of components for doing so. User interface 38 may be a stand-alone module or may be part of an infotainment system or part of some other module, device or system in the vehicle. Depending on the particular embodiment, user interface 38 may include an input/output device that can both receive information from and provide information to the vehicle occupants (e.g., a touch-screen display on a center stack/console or a voice-recognition human-machine interface (HMI)), or a combination of input devices (e.g., steering-wheel mounted switches or a microphone) and output devices (e.g., a speaker, an instrument panel gauge, or a visual indicator on the rear-view mirror), or some other component. Through user interface 38, a driver of vehicle 10 may input a speed indicative of a desired speed of vehicle 10 and a spacing input indicative of a desired spacing between vehicle 10 and a vehicle located in front of vehicle 10 and travelling in the same lane.

Controller 40 is provided to control the operation of elements of the vehicle power train 42 used to drive the vehicle wheels and elements of the vehicle brakes 42 used to slow or halt rotation of the vehicle wheels in order to maintain the desired speed and spacing of vehicle 10 selected by the vehicle driver. It should be understood that the system and method disclosed herein may be used in vehicles having a wide variety of power trains including those found in traditional vehicles, hybrid electric vehicles (HEVs), extended-range electric vehicles (EREVs), and battery electrical vehicles (BEVs). Accordingly, power train 42 may include an internal combustion engine and controller 40 may control one or more input systems to the engine including a throttle valve system, fuel injection system or spark ignition system. The engine may comprise any of a gasoline, diesel, ethanol, flex-fuel, naturally aspirated, turbo-charged, super-charged, rotary, Otto-cycle, Atkinscycle or Miller-cycle engine, or any other suitable engine type known in the art. Alternatively, or in addition, power train 42 may include an electric motor that drives the wheels using energy from the engine or a vehicle battery and controller 40 may generate control signals used in controlling the delivery of current to and within the motor. The motor may be combined with a generator (a so-called "mogen") for use in regenerative braking. The motor may also include multiple electric motors (e.g., separate motors for the front and rear wheels, separate motors for each wheel, separate motors for different functions, etc.). The motor may comprise an AC or DC motor, brushed or brushless motor, permanent magnet motor, etc., and may be connected in any number of different configurations, and may include any number of different components, like cooling features, sensors, control units and/or any other suitable components known in the art. Brakes 44 may comprise an anti-lock braking system operating under the control of a brake control module.

Controller 40 may include a variety of electronic processing devices, memory devices, input/output (I/O) devices, and/or other known components, and may perform various control and/or communication related functions. The electronic processing device may comprise a microprocessor, a microcontroller, an application specific integrated circuit (ASIC), etc. that executes instructions for software, firmware, programs, algorithms, scripts, etc. that are stored in a memory device. In addition to the executable instructions for the processing device, the memory device may store sensor readings (e.g. sensor readings from sensors 16, 18, 20, 22) and pertinent characteristics and background information pertaining to vehicle 10, such as information relating to stopping distances, deceleration limits, temperature limits, moisture or precipitation limits, vehicle settings, personalized driver settings, driving habits or other driver behavioral data, etc. in various look up tables or other data structures. Controller 40 may be electronically connected to other vehicle devices, modules and systems—including, for example, controller 36—via a vehicle communications bus or other communication means and can interact with them when required. Depending on the particular embodiment, controller 40 may be a stand-alone component (as schematically illustrated in FIG. 1), may be incorporated or included within another vehicle module, or may be part of a larger network or system.

Sensors 16, 18, 20, 22, 24, 26, 28, 30, 32 are provided to detect a variety of conditions and may include, for example, sensors 16, 18, 20, 22 that detect operating conditions of vehicle 10, sensors 24 that detect environmental conditions relating to the operating environment of vehicle 10, and sensors 26, 28, 30, 32 that detect characteristics of objects external to vehicle 10 (e.g., other vehicles, guardrails, etc.) including the presence or absence of such objects, the position or change in position of such objects, and movements of such objects. Sensors 16, 18, 20, 22, 24, 26, 28, 30, 32 may be embodied in hardware, software, firmware or some combination thereof. Sensors 16, 18, 20, 22, 24, 26, 28, 30, 32 may directly sense or measure the conditions for which they are provided, or they may indirectly evaluate such conditions based on information provided by other sensors, components, devices, modules, systems, etc. Sensors 16, 18, 20, 22, 24, 26, 28, 30, 32 may be directly coupled to controller 36, indirectly coupled via other electronic devices, a vehicle communications bus, network, etc., or coupled according to some other arrangement known in the art. Sensors 16, 18, 20, 22, 24, 26, 28, 30, 32 may be integrated within another vehicle component, device, module, system, etc. (e.g., an engine control module (ECM), traction control system (TCS), electronic stability control (ESC) system, antilock brake system (ABS), etc.), may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as any type of suitable sensor arrangement may be used. Sensors 16, 18, 20, 22, 24, 26, 28, 30, 32 may employ variety of different sensing techniques depending on the application.

In the example shown in FIG. 1, sensors 16, 18, 20, 22 comprise individual wheel speed sensors that are coupled to each wheel of vehicle 10 and separately report the rotational velocity of each wheel. Skilled artisans will appreciate that sensors 16, 18, 20, 22 may operate according to optical, electromagnetic or other technologies, and that other parameters may be derived or calculated from the velocity readings, such as vehicle acceleration. In another embodiment, sensors 16, 18, 20, 22 determine vehicle speed relative to the ground by directing radar, laser and/or other signals towards the ground and analyzing the reflected signals, or by employing feedback from a navigation module (not shown) that has Global Positioning System (GPS) capabilities.

Sensor 24 provides one or more outside or environmental readings that may be used to detect and/or evaluate current environmental conditions that may affect vehicle 10. For example, environmental sensor 24 may include an outside temperature sensor, an outside humidity sensor, a precipitation sensor, or any other type of sensor that senses or gathers environmental readings. The outside temperature sensor may sense ambient air temperatures, and may do so in any number of different ways. Environmental sensor 24 may determine environmental conditions by direct sensing and measurement of environmental readings, indirect determination of environmental readings by gathering data from other modules or systems in the vehicle, or by receiving wireless transmissions through communications module 34 that include weather reports, forecasts, etc. from a weather-related service or website. Other examples of environmental sensors are possible as well. As illustrated in the exemplary embodiment of FIG. 1, environmental sensor 24 may be mounted to vehicle 10 and be coupled to controller 36 through suitable communication means such as a vehicle communications bus.

Sensors 26, 28, 30, 32 detects characteristics of objects proximate vehicle 10 (e.g., other vehicles, guardrails, etc.) including the presence or absence of such objects, the size and shape of such objects, the position or change in position of such objects, and movements of such objects. Sensors 26, 28, 30, 32 may form part of one or more collision mitigation and avoidance systems that detect and attempt to mitigate or avoid collisions with objects external to vehicle 10 such as a forward collision warning system, front automatic braking system, forward or rear park assist system, lane departure warning system, side blind zone alert system, side or rear object detection system, or rear automatic braking system. In the illustrated embodiment, sensors 26, 28, 30, 32 may be used to detect the presence, size and shape, position or movement of other vehicles that are travelling in the same lane as vehicle 10 in front of or behind vehicle 10 and in lanes adjacent to the lane in which vehicle 10 is travelling.

Sensors 26, 28, 30, 32 may generate signals indicative of the position, velocity and/or acceleration of the vehicle or other object. The information conveyed by the signals may be absolute in nature (e.g., a velocity or acceleration of the object that is relative to ground) or relative in nature (e.g., a relative velocity or acceleration that is a difference between the velocities or accelerations of vehicle 10 and the object). Sensors 26, 28, 30, 32 may each comprise a single sensor a combination of sensors and may comprise a radio detection and ranging (RADAR) device, a light detection and ranging (LIDAR) device, ultrasonic device, vision device (e.g., camera, etc.) or a combination thereof.

Communications module 34 may include any combination of hardware, software and/or other components that enable wireless voice and/or data communication between vehicle 10 and some other entity. According to one exemplary embodiment, communications module 34 includes a voice interface, a data interface and a GPS receiver, and may be bundled or integrated within a device such as a telematics unit. The voice interface enables voice communication to and/or from vehicle 10 and may include a cellular chipset (e.g., CDMA or GSM chipset), a vocoder, voice over IP (VOIP) equipment, and/or any other suitable device. The data interface, on the other hand, enables data communication to and/or from vehicle 10 and may include a modem (e.g., a modem using EVDO, CDMA, GPRS or EDGE technologies), a wireless networking component (e.g., one using an IEEE 802.11 protocol, WiMAX, BlueTooth, etc.), or any other suitable device. Depending on the particular embodiment, communications module 34 may communicate over a wireless carrier system (e.g., a cellular network), a wireless network (e.g., a wireless LAN, WAN, etc.), or some other wireless medium. The GPS receiver may receive signals from a constellation of GPS satellites and use these signals to determine vehicle position, as is well understood in the art.

The present method may use communications module 34 for vehicle to vehicle (V2V) communication in order to exchange information between vehicle 10 and other vehicles on the road. In particular, module 34 may receive information from other vehicles indicative of the position of the other vehicles and/or the relative position between vehicle 10 and the other vehicles. Many modern vehicles include a side blind zone alert system that detects when another vehicle is in the blind spot of the vehicle. Vehicles having such systems may transmit information to vehicle 10 through communications module 34 to advise vehicle 10 that it is or will be in the blind spot of another vehicle. Vehicle 10 may also receive other information through module 34 to assist vehicle 10 in evaluating the size of the blind spot and the time that vehicle 10 will be in the blind spot including the type and size of the other vehicle, the speed (and any change in speed) at which the vehicle is travelling, and whether the vehicle will remain in its current path or change paths (e.g., by changing lanes).

Controller 36 processes signals from sensors 16, 18, 20, 22, 24, 26, 28, 30, 32 and communications module 34 to detect conditions in which vehicle 10 is or will be positioned in a blind spot of another vehicle or vehicles. Controller 36 then generates control signals to adjust the position of vehicle 10 in response to those conditions using automated driving system 14 in order to reduce the amount of time vehicle 10 is or will be positioned in the blind spot(s) of the other vehicle(s). Controller 36 may include a variety of electronic processing devices, memory devices, input/output (I/O) devices, and/or other known components, and may perform various control and/or communication related functions. Controller 36 may include an electronic processing device 46 that may comprise a microprocessor, a microcontroller, an application specific integrated circuit (ASIC), etc. and that executes instructions for software, firmware, programs, algorithms, scripts, etc. that are stored in memory device 48. Controller 36 may further include a memory device 48 that stores executable instructions for processing device 56, sensor readings (e.g. sensor readings from sensors 16, 18, 20, 22, 24, 26, 28, 30, 32) and pertinent characteristics and background information pertaining to vehicle 10, such as information relating to stopping distances, deceleration limits, temperature limits, moisture or precipitation limits, vehicle settings, personalized driver settings, driving habits or other driver behavioral data, etc. in various look up tables or other data structures. Controller 36 may be electronically connected to other vehicle devices, modules and systems—including, for example, controller 40 of automated driving system 14—via a vehicle communications bus or other communication means and can interact with them when required. Depending on the particular embodiment, controller 36 may be a stand-alone component (as schematically illustrated in FIG. 1), may be incorporated or included within a larger system (such as engine management system, power train system, vehicle safety system, etc. to name a few possibilities).

Figure 2:
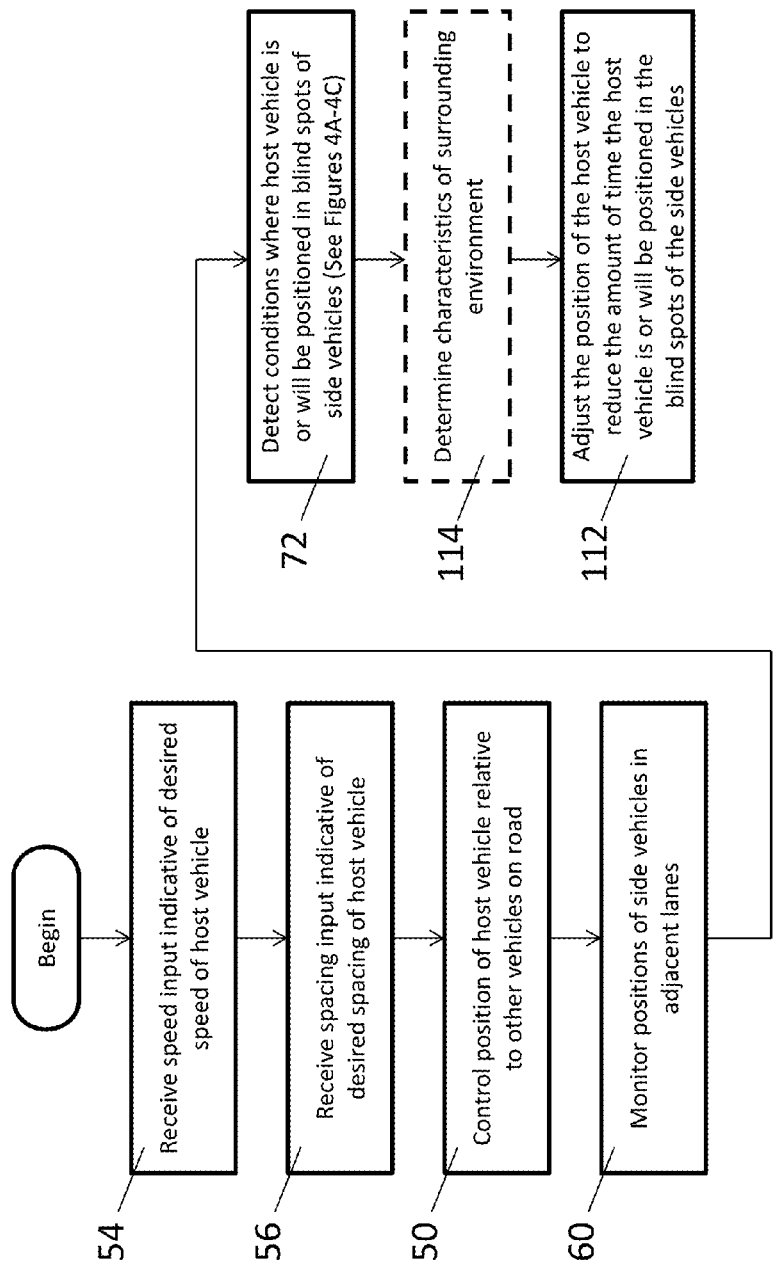
FIG. 2 is a flowchart illustrating one embodiment of a method for controlling a position of the vehicle relative to other vehicles on a road.

In accordance with one embodiment controller 36 is configured with appropriate programming instructions or code (i.e., software) to perform several steps in a method for controlling a position of vehicle 10 relative to other vehicles on a road. The code may be stored in memory device 48 of controller 36 and may be uploaded to memory device 48 from, a conventional computer storage medium. Referring now to FIGS. 2-3, the method may include the step 50 of controlling a position of a host vehicle 10 travelling in a lane 52 of a road using an automated driving system 14. As noted above, in one embodiment the automated driving system 14 may comprise an adaptive cruise control system. In this embodiment, step 50 may be preceded by the steps 54, 56 of receiving a speed input indicative of a desired speed of the host vehicle 10 and receiving a spacing input indicative of a desired spacing between the host vehicle 10 and a forward vehicle 58 located in front of the host vehicle 10 in the same lane 52. The speed and spacing inputs may be input by the driver of the host vehicle 10 using interface 38. The spacing input may, for example, be selected from among a plurality of potential spacings based on time and/or distance (e.g., one second behind the forward vehicle 58, two seconds behind the forward vehicle 58, etc.). In the embodiment where the automated driving system 14 comprises an adaptive cruise control system, the step 50 of controlling the position of the host vehicle 10 may include controlling the position to maintain an actual speed corresponding to the desired speed input by the driver and an actual spacing corresponding to the desired spacing input by the driver.

The method may continue with the step 60 of monitoring the positions of one or more side vehicles, such as side vehicles 62, 64, 66 located on either side of the host vehicle 10 and traveling in lanes 68, 70 of the road adjacent to the lane 52 of the road in which host vehicle 10 is traveling. As noted hereinabove, the positions of side vehicles 62, 64, 66 can be monitored using one or more of sensors 26, 28, 30, 32. The positions may also be monitored by tracking signals generated by side vehicles 62, 64, 66 and received through communications module 34.

The method may continue with the step 72 of detecting a condition in which the host vehicle 10 is or will be positioned in a blind spot 74, 76, 78, 80 of a side vehicle 62, 64, 66 disposed on a side of the host vehicle 10 in one of the adjacent lanes 68, 70. Controller 36 may be configured with appropriate instructions to detect such a condition responsive to signals from sensors 26, 28, 30, 32 and/or communication module 34. Controller 36 may be further configured to detection conditions in which the host vehicle 10 is or will be positioned in multiple blind spots 74, 76, 78, 80 of side vehicles 62, 64, 66. In particular, controller 36 may be configured to detect conditions in which the host vehicle 10 is or will be positioned in multiple blind spots 74, 76, 78, 80, simultaneously such as when side vehicles 62, 64, 66, are disposed on either side of host vehicle 10 in adjacent lanes 68, 70. Controller 36 may also be configured to detect conditions in which the host vehicle 10 is or will be positioned in multiple blind spots sequentially such as when the host vehicle 10 will travel through multiple blind spots 78, 80 associated with a single side vehicle 66 such as a tractor-trailer, or through multiple blind spots 74, 76 of multiple side vehicles 62, 64 traveling in a single adjacent lane 68, or through multiple staggered blind spots such as blind spots 76, 78, associated with side vehicles 64, 66 traveling in lanes 68, 70 on either side of the host vehicle 10.

The detecting step 72 may be performed in several different ways. Referring to FIG. 4A, in one embodiment, step 72 may include a substep 82 of receiving a wireless signal transmitted by a side vehicle 62, 64, 66 indicating that the host vehicle 10 is or will be positioned in one or more blind spots 74, 76, 78, 80 of the side vehicle 62, 64, 66. As noted above, many modern vehicles include a side blind zone alert system that detects when another vehicle is in the blind spot of the vehicle. Side vehicles 62, 64, 66 having such a system may transmit information to host vehicle 10 through communications module 34 to advise vehicle 10 that it is or will be in the blind spot 74, 76, 78, 80 of the side vehicle 62, 64, 66. In addition to communicating that the host vehicle 10 is or will be positioned in a blind spot 74, 76, 78, 80 of a side vehicle 62, 64, 66 the same signal (or additional signals) from the side vehicle 62, 64, 66 may communicate information relating to the side vehicle 62, 64, 66 in order to assist host vehicle 10 in identifying the location and/or size of the blind spot including the type of vehicle (e.g., is the side vehicle 62, 64, 66 a passenger vehicle or a tractor-trailer) and/or size of the side vehicle 62, 64, 66 the speed (and any change in speed) at which the side vehicle 62, 64, 66 is travelling, and whether the side vehicle 62, 64, 66 will remain in its current path or change paths (e.g., by moving from lane 68, 70 to another lane).

Referring to FIG. 4B, in another embodiment, step 72 may include the substeps 84, 86 of determining a length of the side vehicle 62, 64, 66 and identifying an area comprising a blind spot 74, 76, 78, 80 of the side vehicle 62, 64, 66 responsive to the length of the side vehicle 62, 64, 66. Sensors 26, 28, 30, 32 may be configured to generate signals indicative of the length of a side vehicle 62, 64, 66. Controller 36 may determine the length of the side vehicle 62, 64, 66 from these signals and identify the area of one or more blind spots 74, 76, 80, 80 of the side vehicle 62, 64, 66 responsive to the length of the side vehicle 62, 64, 66. Substep 86 may itself include the substep 88 of calculating the area comprising the blind spot 74, 76, 78, 80 of the side vehicle 62, 64, 66 responsive to the length of the side vehicle 62, 64, 66. Vehicles of the same length will typically include blind spots of substantially the same size. Therefore, controller 36 may be configured to calculate the size of a blind spot 74, 76, 78, 80 based on the length of the side vehicle 62, 64, 66. Substep 86 may further include the substep 90 of locating the area relative to a fixed point on the side vehicle 62, 64, 66. For example, and with reference to FIG. 3, the blind spot area may be attached to and oriented relative to a fixed point such as the B-pillar 92 of the side vehicle 62, 64, 66 or the rear end 94 of the side vehicle 62, 64, 66. Referring again to FIG. 4B, step 72 may finally include the substep 96 of determining whether the host vehicle 10 is or will be positioned in the blind spot 74, 76, 78, 80 of the side vehicle 62, 64, 66. Having identified the area of the blind spot and having located that blind spot relative to a side vehicle 62, 64, 66 controller 36 can assess whether the host vehicle 10 is presently in, or will become positioned in, the blind spot 10 based on data include the current speed of the host vehicle 10 (e.g. as measured by wheel speed sensors 16, 18, 20, 22), the current position of host vehicle 10 (e.g., as measured by a GPS receiver) and the positions of the side vehicles 62, 64, 66 (e.g. as determined using sensors 26, 28, 30, 32).

Referring to FIG. 4C, in yet another embodiment, step 72 may include a substep 98 of determining a vehicle type of a side vehicle 62, 64, 66 in one of the adjacent lanes 68, 70. Substep 98 may itself include the substeps 100, 102 of determining a length of the side vehicle 62, 64, 66 and identifying the vehicle type of the side vehicle 62, 64, 66 based on the length of the side vehicle 62, 64, 66. As noted above, sensors 26, 28, 30, 32 may be configured to generate signals indicative of the length of a side vehicle 62, 64, 66. Based on the measured length, controller 36 may be configured to identify the vehicle type of the side vehicle 62, 64, 66. For example, a tractor trailer will typically be much longer than a passenger vehicle.

Step 72 may further include the substep 104 of identifying an area comprising a blind spot 74, 76, 80, 80 of a side vehicle 62, 64, 66 responsive to the vehicle type of the side vehicle 62, 64, 66. Although the blind spots for each vehicle have unique characteristics based on the profile of the vehicle, there will be similarities in the blind spots for vehicles falling within a particular class such as a passenger vehicle. Substep 104 may, for example, include the substep 106 of selecting an area from among a plurality of areas having predetermined sizes based on the previously determined vehicle type. These areas may be stored in an electronic memory such as memory 48. Substep 104 may further include the substep 108 of locating the area relative to a fixed point on the side vehicle 62, 64, 66. For example, and with reference to FIG. 3, the blind spot area may be attached to and oriented relative to a fixed point such as the B-pillar 92 of the side vehicle 62, 64, 66 or the rear end 94 of the side vehicle 62, 64, 66.

Step 72 may finally include the substep 110 of determining whether the host vehicle 10 is or will be positioned in the blind spot 74, 76, 78, 80 of the side vehicle 62, 64, 66. Having identified the area of the blind spot and having located that blind spot relative to a side vehicle 62, 64, 66 controller 36 can assess whether the host vehicle 10 is presently in, or will become positioned in, the blind spot 74, 76, 78, 80 based on data include the current speed of the host vehicle 10 (e.g. as measured by wheel speed sensors 16, 18, 20, 22), the current position of host vehicle 10 (e.g., as measured by a GPS receiver) and the positions of the side vehicles 62, 64, 66 (e.g. as determined using sensors 26, 28, 30, 32).

Referring again to FIG. 2, the method may continue with the step 112 of adjusting the position of the host vehicle 10 in response to the detected conditions wherein the host vehicle 10 is or will be positioned in tone or more blind spots 74, 76, 78, 80 of side vehicles 62, 64, 66 using the automated driving system 14 such that the amount of time the host vehicle 10 is or will be positioned in the blind spots 74, 76, 78, 80 of the side vehicles 62, 64, 66 is reduced. In the embodiment in which the automated driving system 14 comprises an adaptive cruise control system, step 112 may comprise adjusting at least one of the actual speed of host vehicle 10 or the actual spacing between host vehicle 10 and a forward vehicle 58 in response to the detected condition. Controller 36 may, for example, use the adaptive cruise control system to increase or reduce the speed of the host vehicle 10 to move the host vehicle 10 out of or through the blind spots 74, 76, 78, 80. Similarly, controller 36 may use the adaptive cruise control system to increase or reduce the spacing between the host vehicle 10 and a forward vehicle 58 to move the host vehicle 10 out of or through the blind spots 74, 76, 78, 80. Controller 36 may be further configured to adjust at least one of the actual speed and the actual spacing of the host vehicle 10 in response to detected condition and at least one of the desired speed and the desired spacing. For example, if the actual speed of the host vehicle 10 is already at the desired speed, controller 36 may cause the adaptive cruise control system to decrease the speed when a blind spot condition is detected as opposed to increase the speed so that the host vehicle 10 is not made to travel at an undesirably high rate of speed for the driver. Similarly, if the actual spacing of the host vehicle 10 relative to a forward vehicle 58 is already at a desired spacing, controller 36 may cause the adaptive cruise control system to increase the spacing when a blind spot condition is detected as opposed to decrease the spacing so that the host vehicle 10 is not made to travel at an uncomfortably close spacing for the driver.

In adjusting the position of the host vehicle 10, controller 36 may be configured to take into account a variety of information regarding surrounding vehicles and objects. Therefore, in some embodiments, the adjusting step may be preceded by a step 114 of determining one or more characteristics of the surrounding environment. For example, in one embodiment, step 114 may include determining the type of vehicle of the side vehicle 62, 64, 66 whose blind spot 74, 76, 78, 80 the host vehicle 10 is or will be positioned in. The size or profile of certain types of vehicles may create an increased risk for the host vehicle 10 when traveling in the blind spots of such vehicles. For example, a greater risk to host vehicle 10 may exist from traveling in the blind spot 78, 80 of a larger tractor-trailer 66 than the blind spot 74, 76 of another smaller passenger vehicle 62, 64. Therefore, controller 36 may adjust the position of the host vehicle 10 using the automated driving system 14 in response to the detected blind spot condition and the type of vehicle in light of the varying risk. For example, controller 36 may use the automated driving system to adjust the position of host vehicle 10 more rapidly in the case of certain types of vehicles because of a perception of an increased risk based on the type of vehicle.

In another embodiment, step 114 may include determining an amount of time during which the host vehicle 10 will be positioned in a blind spot 74, 76, 78, 80. In general, the longer the host vehicle 10 remains in a particular blind spot 74, 76, 78, 80, the more likely it is that the side vehicle 62, 64, 66 will not be aware of (or lose track of) the host vehicle 10 thereby increasing the risk to the host vehicle 10. Conversely, if the host vehicle 10 will only be within a blind spot 74, 76, 78, 80 of a side vehicle 62, 64, 66 for a relatively short time, a greater risk may exist in making an adjustment to the position of the host vehicle 10 than in simply allowing the host vehicle 10 to pass through the blind spot 74, 76, 78, 80 without adjustment. Therefore, controller 36 may adjust the position of the host vehicle 10 using the automated driving system 14 in response to the detected blind spot condition and the amount of time that the host vehicle 10 will be positioned in the blind spot. If the controller 36 determines that the host vehicle 10 will be located within a blind spot 74, 76, 78, 80 for a relatively large amount of time, controller 36 may adjust the position of the host vehicle 10 more rapidly or increase the amount of the adjustment (e.g., a greater change in speed or spacing). If the controller 36 determines that the host vehicle 10 will be located within a blind spot 74, 76, 78, 80 for a relatively small amount of time, controller 36 may not adjust the position of the host vehicle 10. In certain embodiments, therefore, step 112 may occur only if the amount of time that the host vehicle 10 will be located within a blind spot 74, 76, 78 80 meets a predetermined condition relative to a threshold amount of time (e.g., is greater than the threshold amount of time).

In yet another embodiment, step 114 may include determining a position of a least one of a forward vehicle 58 disposed in front of the host vehicle 10 and a rear vehicle disposed behind the host vehicle 10 in the lane 52 of the road in which the host vehicle 10 is traveling. In some cases, potential position adjustments may be limited by the position of a another vehicle within the same lane 52 as the host vehicle 10 and either in front of or behind the host vehicle 10. For example, adjusting the position of the host vehicle 10 by increasing or decreasing the speed of the vehicle 10 may not be possible if another vehicle is relatively close to the host vehicle 10 in front of or behind the host vehicle 10, respectively. Similarly, adjusting the spacing of the host vehicle 10 relative to a forward vehicle 58 by increasing the spacing may not be possible if another vehicle is disposed to the rear of the host vehicle 10. Therefore, controller 36 may adjust the position of the host vehicle f-using the automated driving system 14 in response to the detected blind spot condition and the position of at least one of a forward vehicle 58 in front of the host vehicle 10 and a rear vehicle disposed behind the host vehicle 10. The position of forward and rear vehicles may be determined using sensors 26, 28, respectively. If the controller 36 determines that increasing the speed or decreasing the speed of host vehicle 10 would create a risk relative to a forward or rear vehicle, respectively, controller 36 can make a different positional adjustment such as adjusting the speed of host vehicle 10 in the opposite direction. If the controller 36 determines that increasing the spacing of the host vehicle 10 relative to a forward vehicle 58 would create a risk relative to a rear vehicle, controller 36 can also make a different positional adjustment such as a change in the lane of travel for host vehicle 10.

In yet another embodiment step 114 may include assessing the availability of a lane adjacent to the lane 52 in which the host vehicle 10 is traveling. In some cases, it may be more desirable to move the host vehicle 10 into an adjacent lane and further away from the lane of travel of the side vehicle 62, 64, 66 whose blind spot 74, 76, 78, 80 the host vehicle 10 is or will be positioned in. Prior to adjusting the lane of travel for host vehicle 10, however, controller 36 may assess whether an adjacent lane exists and, if so, whether there is another vehicle or other object that would obstruct travel of the host vehicle 10. Sensors 30, 32 and/or a navigation system may be used to determine whether an adjacent lane exists while sensors 30, 32 may be used to determine whether another vehicle or object is located within the lane. If controller 36 determines that an adjacent lane is available, controller 36 may adjust the position of the host vehicle 10 by performing an automated lane change maneuver to the adjacent lane.

In yet another embodiment, step 114 may include determining whether an adjusted position of the host vehicle 10 will cause the host vehicle 10 to enter another blind spot 74, 76, 78, 80. In some cases—particularly in heavy traffic—adjusting the position of the host vehicle 10 to avoid one detected blind spot condition may result in moving the host vehicle 10 into another blind spot 74, 76, 78, 80. Therefore, controller 36 may assess the impact of a proposed adjustment and determine whether the proposed adjustment will place the host vehicle 10 into another blind spot 74, 76, 78, 80. Sensors 26, 28, 30, 32 may again be used to detect the presence of additional vehicles on the roadway and controller 36 may identify blind spots for those vehicles responsive to signals from sensors 26, 28, 30, 32. If controller 36 determines that an adjusted position of the host vehicle 10 will cause the host vehicle 10 to enter another blind spot 74, 76, 78, 80, controller 36 may decline to make the adjustment It should be understood that controller 36 may be configured to contemporaneously, and even simultaneously, detect a plurality of conditions in which the host vehicle 10 is or will be positioned in a plurality of blind spots 74, 76, 78, 80 from either a single vehicle 62, 64, 66 or multiple vehicles 62, 64, 66. For example, controller 36 may detect conditions in which the host vehicle 10 is or will be positioned in multiple blind spots 78, 80 of the same side vehicle 66 (such as a tractor-trailer) as the host vehicle 10 is traveling within a lane 52. Controller 36 may also detect conditions in which the host vehicle 10 is or will be positioned in multiple blind spots 74, 76 of multiple side vehicles 62, 64 traveling in a single adjacent lane 68 as the host vehicle 10 is traveling within lane 52. Controller 36 may also detect conditions in which the host vehicle 10 is or will be positioned in multiple blind spots 74, 76, 78, 80 of multiple side vehicles 62, 64, 66 traveling in adjacent lanes 68, 70 on either side of the lane 52 that host vehicle 10 is travelling in (e.g., blind spots 76, 80 of side vehicles 64, 66 in FIG. 2).

Controller 36 may be configured to adjust the position of host vehicle 10 in response to the plurality of detected blind spot conditions by using automated driving system 14 such that the amount of time that host vehicle 10 is or will be positioned in at least one of the blind spots 74, 76, 78, 80 is reduced. In some cases, controller 36 may be configured to adjust the position of host vehicle 10 such that the amount of time host vehicle 10 is or will be position in multiple blind spots 74, 76, 78, 80 will be reduced. For example, controller 36 may assess options for increasing or decreasing the speed of host vehicle 10 or the spacing of host vehicle 10 relative to a forward vehicle 58 with a preference for the option that will minimize the total amount of time spent in multiple blind spots 74, 76, 78, 80. In other cases, controller 36 may be configured to adjust the position of host vehicle 10 relative to multiple blind spots 74, 76, 78, 80 only under certain conditions. For example, controller 36 may be configured to determine a distance between multiple blind spots 74, 76 and adjust the position of the host vehicle 10 such that the amount of time the host vehicle 10 is or will be positioned in only one of the blind spots 74, 76 is reduced if the distance meets a predetermined condition relative to a predetermined distance (e.g., if the distance is greater than a predetermined distance such that there is less value in considering the two blind spots together). In yet other cases, controller 36 may be configured to perform a threat assessment of multiple blind spots and to adjust the position of the host vehicle 10 in response that threat assessment. For example, controller 36 may determine that the threat posed from the positioning of the host vehicle 10 relative to one blind spot, such as a blind spot 76 that the host vehicle 10 is currently within, is greater than the threat posed from the positioning of the host vehicle 10 relative to another blind spot such as a blind spot 74 that the host vehicle 10 will later become positioned in. Controller 36 may be configured to adjust the position of the host vehicle 10 in response to the threat assessment to avoid the blind spot that poses the greater threat.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling a position of a vehicle relative to other vehicles on a road, comprising the steps of:
    controlling a position of a host vehicle travelling in a lane of a road using an automated driving system;
    monitoring positions of one or more side vehicles located on either side of the host vehicle and traveling in lanes of the road adjacent to the lane of the road in which the host vehicle is travelling;
    detecting a first condition in which the host vehicle is or will be positioned in a first blind spot of a first side vehicle disposed on a first side of the host vehicle and in a first adjacent lane to the lane of the road in which the host vehicle is travelling; and,
    adjusting the position of the host vehicle in response to the first condition using the automated driving system such that the amount of time the host vehicle is or will be positioned in the first blind spot of the first side vehicle is reduced.

2. The method of claim 1, wherein the detecting step further comprises:
    determining a vehicle type of the first side vehicle;
    identifying an area comprising the first blind spot of the first side vehicle responsive to the vehicle type of the first side vehicle; and,
    determining whether the host vehicle is or will be positioned in the first blind spot of the first side vehicle.

3. The method of claim 2, wherein the determining step further comprises:
    determining a length of the first side vehicle; and,
    identifying the vehicle type of the first side vehicle based on the length of the first side vehicle.

4. The method of claim 2, wherein the identifying step further comprises:
    selecting the area from among a plurality of areas stored in an electronic memory, each of the plurality of areas having a predetermined size; and,
    locating the area relative to a fixed point on the first side vehicle.

5. The method of claim 4 wherein the fixed point is at least one of a B-pillar and a rear end of the first side vehicle.

6. The method of claim 1, wherein the detecting step further comprises:
    determining a length of the first side vehicle;
    identifying an area comprising the first blind spot of the first side vehicle responsive to the length of the first side vehicle; and,
    determining whether the host vehicle is or will be positioned in the first blind spot of the first side vehicle.

7. The method of claim 6, wherein the identifying step further comprises:
    calculating the area comprising the first blind spot of the first side vehicle responsive to the length of the first side vehicle; and,
    locating the area relative to a fixed point on the first side vehicle.

8. The method of claim 1, wherein the detecting step further comprises receiving a wireless signal transmitted by the first side vehicle indicating that the host vehicle is or will be positioned in the first blind sport of the first side vehicle.

9. The method of claim 8, wherein the wireless signal transmitted by the first side vehicle includes information relating to at least one of the type of vehicle of the first side vehicle and the length of the first side vehicle.

10. The method of claim 1, further comprising the step of determining a type of vehicle of the first side vehicle and wherein the adjusting step further comprises adjusting the position of the host vehicle using the automated driving system in response to the first condition and to the type of vehicle of the first side vehicle.

11. The method of claim 1, further comprising the step of determining an amount of time during which the host vehicle will be positioned in the first blind spot and wherein the adjusting step further comprises adjusting the position of the host vehicle using the automated driving system in response to the first condition and to the amount of time that the host vehicle will be positioned in the first blind spot.

12. The method of claim 11, wherein the adjusting step occurs only if the amount of time meets a predetermined condition relative to a threshold amount of time.

13. The method of claim 1, further comprising the step of determining a position of at least one of a forward vehicle disposed in front of the host vehicle and a rear vehicle disposed behind the host vehicle in the lane of the road in which the host vehicle is travelling and wherein the adjusting step further comprises adjusting the position of the host vehicle in response to the first condition and to the position of the at least one of the forward vehicle and the rear vehicle.

14. The method of claim 1, wherein the automated driving system comprises an adaptive cruise control system and the method further comprises the steps of:
    receiving a speed input indicative of a desired speed of the host vehicle; and,
    receiving a spacing input indicative of a desired spacing between the host vehicle and a forward vehicle located in front of the host vehicle in the lane of the road in which the host vehicle is travelling;

wherein the controlling step further comprises controlling the position of the host vehicle to maintain an actual speed corresponding to the desired speed and an actual spacing corresponding to the desired spacing and the adjusting step further comprises adjusting at least one of the actual speed and the actual spacing in response to the first condition.

15. The method of claim 14, wherein the adjusting step further comprises adjusting the at least one of the actual speed and the actual spacing in response to the first condition and at least one of the desired speed and the desired spacing.

16. The method of claim 1 wherein the adjusting step further comprises the steps of:

assessing the availability of a second adjacent lane to the lane of the road in which the host vehicle is travelling;

adjusting the position of the host vehicle by performing an automated lane change maneuver to the second adjacent lane in response to the first condition and the availability of the second adjacent lane.

17. The method of claim 1, wherein the adjusting step further comprises the step of determining whether an adjusted position of the host vehicle will cause the host vehicle to enter a second blind spot and only adjusting the position of the host vehicle in response to the first condition if the adjusted position of the host vehicle will not cause the host vehicle to enter the second blind spot.

18. A method for controlling a position of a vehicle relative to other vehicles on a road, comprising the steps of:

controlling a position of a host vehicle travelling in a lane of a road using an automated driving system;

monitoring positions of one or more side vehicles located on either side of the host vehicle and traveling in lanes of the road adjacent to the lane of the road in which the host vehicle is travelling;

detecting a first condition in which the host vehicle is or will be positioned in a first blind spot of a first side vehicle disposed on a first side of the host vehicle and in a first adjacent lane to the lane of the road in which the host vehicle is travelling;

detecting a second condition in which the host vehicle is or will be positioned in a second blind spot of one of the first side vehicle and a second side vehicle, the second side vehicle disposed on one of the first side of the host vehicle in the first adjacent lane and a second side of the host vehicle in a second adjacent lane to the lane of the road in which the host vehicle is travelling; and, adjusting the position of the host vehicle in response to the first and second conditions using the automated driving system such that the amount of time the host vehicle is or will be positioned in at least one of the first and second blind spots is reduced.

19. The method of claim 18, wherein the adjusting step further comprises adjusting the position of the host vehicle such that the total amount of time the host vehicle is or will be positioned in both of the first and second blind spots is reduced.

20. The method of claim 18, further comprising the step of determining a distance between the first and second blind spots, and wherein the adjusting step further comprises adjusting the position of the host vehicle such that the amount of time the host vehicle is or will be positioned in only one of the first and second blind spots is reduced if the distance meets a predetermined condition relative to a predetermined distance.

21. The method of claim 20, further comprising the step of performing a threat assessment of the first and second blind spots and wherein the adjusting step further comprises adjusting the position of the host vehicle in response to the threat assessment.

22. A system for controlling a position of a vehicle relative to other vehicles on a road, comprising:

an automated driving system configured to control a position of the host vehicle travelling in a lane of a road;

at least one sensor configured to generate a signal indicative of the positions of one or more side vehicles located on either side of the host vehicle and traveling in lanes of the road adjacent to the lane of the road in which the host vehicle is travelling; and, a controller configured to detect a first condition in which the host vehicle is or will be positioned in a first blind spot of a first side vehicle disposed on a first side of the host vehicle and in a first adjacent lane to the lane of the road in which the host vehicle is travelling; and, adjust the position of the host vehicle in response to the first condition using the automated driving system such that the amount of time the host vehicle is or will be positioned in the first blind spot of the first side vehicle is reduced.

\* \* \* \* \*